(12) United States Patent
Benthien et al.

(10) Patent No.: US 8,376,276 B2
(45) Date of Patent: Feb. 19, 2013

(54) LOAD INTRODUCTION STRUCTURE, IN PARTICULAR A LINING FRAME, FOR AN AIRCRAFT

(75) Inventors: Hermann Benthien, Sottrum (DE); Michael Kruse, Oyten (DE)

(73) Assignee: Airbus Operations GmbH, Hamburg (DE)

(*) Notice: Subject to any disclaimer, the term of this patent is extended or adjusted under 35 U.S.C. 154(b) by 318 days.

(21) Appl. No.: 12/512,477

(22) Filed: Jul. 30, 2009

(65) Prior Publication Data

US 2010/0038486 A1 Feb. 18, 2010

Related U.S. Application Data

(60) Provisional application No. 61/088,840, filed on Aug. 14, 2008.

(51) Int. Cl.
*B64C 1/00* (2006.01)
(52) U.S. Cl. ............ 244/119; 244/120; 244/131
(58) Field of Classification Search ............ 244/119, 244/17.27, 281, 133, 137.1, 118.1, 131, 117 R, 244/118.2; 29/897.31
See application file for complete search history.

(56) References Cited

U.S. PATENT DOCUMENTS

| | | | |
|---|---|---|---|
| 1,811,304 A * | 6/1931 | Couzinet ............ 244/133 |
| 1,977,616 A * | 10/1934 | Berliner ............ 244/119 |
| 4,479,621 A | 10/1984 | Bergholz |
| 5,762,244 A * | 6/1998 | Wagner et al. ............ 224/281 |
| 6,158,690 A * | 12/2000 | Wadey et al. ............ 244/17.27 |
| 6,536,710 B1 | 3/2003 | Bobzien et al. |
| 6,557,800 B2 * | 5/2003 | Medina et al. ............ 244/118.1 |
| 7,410,128 B2 * | 8/2008 | Nordstrom ............ 244/137.1 |
| 7,775,479 B2 | 8/2010 | Benthien |
| 7,987,596 B2 * | 8/2011 | Ritts et al. ............ 29/897.31 |
| 2006/0091258 A1 * | 5/2006 | Chiu et al. ............ 244/119 |
| 2009/0159750 A1 * | 6/2009 | Sayilgan et al. ............ 244/131 |
| 2010/0001134 A1 * | 1/2010 | Braeutigam et al. ............ 244/119 |
| 2010/0096506 A1 * | 4/2010 | Benthien ............ 244/131 |
| 2011/0068225 A1 * | 3/2011 | Curry et al. ............ 244/118.1 |
| 2011/0108668 A1 * | 5/2011 | Benthien ............ 244/131 |

FOREIGN PATENT DOCUMENTS

| DE | 31 41 869 C2 | 5/1983 |
| DE | 10 2007 011620 | 7/2008 |

OTHER PUBLICATIONS

German Office Action for DE 10 2008 041 257 dated Mar. 19, 2012.

\* cited by examiner

*Primary Examiner* — Christopher P Ellis
*Assistant Examiner* — Medhat Badawi
(74) *Attorney, Agent, or Firm* — Jenkins, Wilson, Taylor & Hunt, P.A.

(57) ABSTRACT

The invention relates to a load introduction structure for an aircraft, comprising two lateral frames which are arranged opposite one another in the two lateral regions of a fuselage airframe structure of the aircraft and adjoin a continuous floor surface which rests on a floor frame. The two lateral frames are connected via the top thereof by a ceiling frame, the ceiling frame being suspended from a ceiling region of the fuselage airframe structure. Each lateral frame is divided into at least two lateral frame segments. At least three track portions which extend parallel to a longitudinal axis of the aircraft are arranged on each lateral frame segment. The lateral frames are connected to the fuselage airframe structure, the ring frames in particular, by a plurality of x-rods, y-rods and y-cardan rods. The load introduction structure is largely uncoupled according to the invention from the fuselage airframe structure of the aircraft inter alia by a plurality of coupling members arranged between the track portions to form gaps in order to compensate for load-induced and/or thermally-induced deformations, in particular changes in length, of the fuselage airframe structure.

13 Claims, 3 Drawing Sheets

LOAD INTRODUCTION STRUCTURE, IN PARTICULAR A LINING FRAME, FOR AN AIRCRAFT

CROSS-REFERENCE TO RELATED APPLICATIONS

This application claims the benefit of U.S. Provisional Application No. 61/088,840, filed Aug. 14, 2008, the entire enclosure of which is herein incorporated by reference.

FIELD OF THE INVENTION

The invention relates to a load introduction structure, in particular a lining frame for an aircraft, comprising two lateral frames which are arranged opposite one another in the two lateral regions of a fuselage airframe structure of the aircraft and adjoin a continuous floor surface.

Aircraft, in particular transport aircraft, are exposed to considerable structural and thermal loads during operation. For example, the external temperature in the region of the outer skin of the fuselage airframe may range between −55° C. and +85° C. and acceleration forces of up to 9 g may act on the useful load inside the fuselage airframe if the aircraft decelerates suddenly or carries out extreme flight manoeuvres. In fuselage airframes largely produced from aluminium alloy materials, variations in temperature generally cause changes in length $\Delta l$ of up to one millimeter per meter of fuselage length. The manoeuvre-induced structural loads within the fuselage airframe of the aircraft also contribute to this effect to a similarly considerable extent, with the result, in the worst case scenario, that there may be a change in length $\Delta l$ of up to two millimeters per meter of effective fuselage airframe length.

The fuselage airframe structure is conventionally formed by a plurality of ring frames arranged in succession and is covered with a fuselage airframe skin to form a sealed and pressure-tight fuselage airframe. In order to reinforce the fuselage airframe structure further, a plurality of stringer profiles which extend parallel to a longitudinal axis of the aircraft and may be connected to the ring frames by retaining clips, are arranged circumferentially on the inner face of the fuselage airframe skin. The interior of the fuselage airframe structure is lined with primary insulation means, formed, for example, from a hardly inflammable, sound-absorbing insulating material, for thermal insulation and/or sound insulation in the case of turboprop propulsion.

A lining frame connected to the fuselage airframe structure is also required to connect useful loads within the fuselage airframe structure and to fasten lining panels, the lining panels also assuming a sound insulation function for cargo aircraft with propeller propulsion. The lining frame absorbs the forces arising from the useful loads, in particular the seats, in all aircraft states and transfers said forces into the primary structure, i.e. the fuselage airframe structure. By definition, the lining frame is a secondary structure and is thus subject to less stringent aviation authorisation and evidentiary requirements. In its function as a secondary structure, the lining frame must not stress the primary structure or cause any additional loads. However, due to the aforementioned operation-induced changes in length of the fuselage airframe of the aircraft, no further loads may be introduced as this would lead to an overload and/or fatigue resulting therefrom, which would mean that the lining frame would lose its status as a secondary structure. Furthermore, the lining frame itself and the connection thereof to the fuselage airframe structure should have an optimal weight and therefore a mass which is as low as possible with a maximum mechanical load capacity. The useful loads are preferably connected to the lining frame by standardised fastening elements such as seat track profiles or the like used as standard in the international aviation industry.

SUMMARY OF THE INVENTION

It is therefore the object of the invention to produce a lining frame for an aircraft, in particular a cargo aircraft, which, at maximum load bearing capacity, enables useful loads, in particular people or the like, to be safely secured in place in the fuselage airframe, in particular in the direction of flight (forward force of up to 9 g in the case of a crash), basically no loads exceeding the forces induced by the useful load alone arising as a result of the mechanical connection of the lining frame to the fuselage airframe structure, even in conjunction with operationally-induced changes in length of the fuselage airframe.

This object is achieved by a load introduction structure with the features of claim 1.

By largely uncoupling the load introduction structure from the fuselage airframe structure of the aircraft to compensate for load-induced and/or thermally-induced deformations, in particular changes in length, of the fuselage airframe structure, no additional stresses are induced into the primary structure of the aircraft regardless of operationally-induced changes in length of the fuselage airframe. On the one hand, the load introduction structure fixes a plurality of different useful load units in place within the fuselage airframe of the (cargo) aircraft. On the other hand, lining panels, which create a sufficiently visually attractive inner lining and must ensure acoustic transmissivity and electromagnetic shielding of the interior of the fuselage airframe, in particular for aircraft with propeller propulsion, are fastened to the load introduction structure.

In an advantageous embodiment, the fuselage airframe structure is formed by a plurality of ring frames, the exterior of which is covered by a fuselage airframe skin, each lateral frame being connected to the ring frame. In this way, the load is optimally transferred from the two lateral frames, which are also of a low weight, into the primary structure of the aircraft in the form of the fuselage airframe structure.

In a further advantageous development of the invention, each lateral frame comprises at least two lateral frame segments, each having at least three track portions which extend parallel to a longitudinal axis of the aircraft and are each connected to at least one vertical strut. This configuration makes it possible to use standardised track portions which allow useful loads to be connected by standardised fastening means. For example, seat track profiles with a grid of holes, which are standard in the aviation industry, can be used as track portions. The seat track profiles extend parallel to a longitudinal axis of the aircraft, basically along the two lateral wall regions of the fuselage airframe structure. Examples of useful loads include canvas seats with integrated head supports for passengers, the passengers in this case sitting along the lateral walls transversely to the direction of flight of the aircraft. Since the passengers are positioned only along the lateral walls in this seating arrangement, a large central region of the floor space remains free for bulky useful load units. Alternatively, an additional seat frame, which is connected from the exterior thereof to the lining frame according to the invention, and in particular is braced thereby, may be arranged in the centre of the interior. In this sitting arrangement, there is a total of four rows of seats. Seats and other useful load units may be fastened in the load introduction structure according to the invention along the lateral walls, the load introduction structure being able to absorb and dissipate the forces which generally act upon it in extreme flight situations. Furthermore, segmentation of the lateral frames enables thermally-induced and/or manoeuvre-induced deformation of the fuselage airframe structure of the aircraft of approximately up to two millimeters per meter of the fuselage length to be compensated according to the invention in such a way that this does not cause any additional increase in load as a result of the load introduction structure. In contrast thereto, people in the currently conventional sitting arrangement face the direction of flight, the top of the seat track profiles which extend parallel to the longitudinal axis of the aircraft and secure the seats using standardised fastening means in standardised grid spaces, generally terminating flush with the floor surface.

A further advantageous embodiment of the invention provides that the two lateral frames are connected by a ceiling frame which is connected in a ceiling region of the fuselage airframe structure. This, in conjunction with a floor surface arranged on a floor frame, enables the fuselage airframe structure to be lined fully.

Further advantageous embodiments of the load introduction structure are provided in the further claims.

DETAILED DESCRIPTION OF THE DRAWINGS

Figure 1:
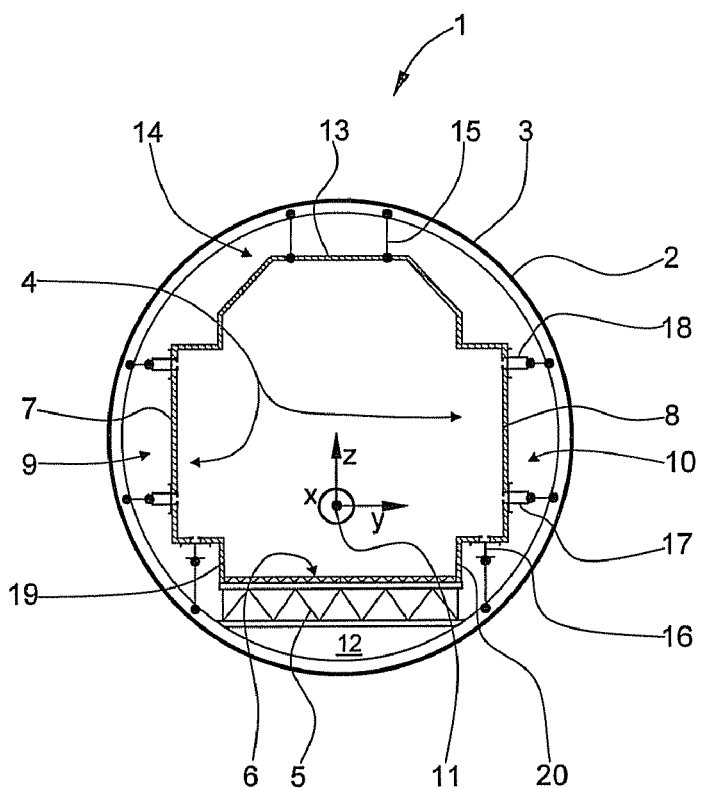
FIG. 1 is a schematic cross-sectional view through a lining frame.

In the drawings, functionally equivalent elements which are repeated a number of times, such as ring frames, stringers or (connection) rods for connecting structural components, fastening means or the like are generally provided with only one reference numeral if there is no difference between them.

FIG. 1 shows a schematic cross-section through a lining frame.

A fuselage airframe structure 1 is formed by a plurality of ring frames 2 arranged in succession. The ring frames 2 are covered by a fuselage airframe 3 to form an inherently closed and pressure-tight fuselage airframe structure.

Arranged within the fuselage airframe structure 1 are a load introduction structure 4 in the form of a lining frame and a floor surface 6 resting on a floor frame 5. The load introduction structure 4 comprises two lateral frames 7, 8 which are arranged opposite one another in lateral regions 9, 10 of the fuselage airframe structure 1. A coordinate system 11 with an x-axis, a y-axis and a z-axis demonstrates the spatial position of all the components. The x-axis direction corresponds to the direction of flight of the aircraft or the longitudinal axis of the aircraft, whereas the z-axis is directed vertically away from the base. The load introduction structure 4 or lining frame is closed off from a bottom region 12 by the floor surface 6 which is formed from a plurality of floor panels (not shown) and rests on the floor frame 5. Said load introduction structure is closed at the top by a ceiling frame 13 which comprises ceiling lining panels (not provided with reference numerals) and is suspended in a ceiling region 14 of the fuselage air structure 1. Both the two lateral frames 7, 8 and the ceiling frame 13 are connected to the ring frame 2 by a plurality of rods. The rods are each individually aligned in each of the three spatial directions of the coordinate system 11, i.e. in the x, y and z directions, for receiving loads. The black circles arranged at either end of said rods represent an optionally articulated rod connection. The rod connections may be formed so as to be single-sided or double-sided and all have at least one degree of freedom.

The construction of the entire load introduction structure 4 is symmetrical relative to the longitudinal axis of the aircraft and so reference will only be made in the following to the lateral frame 8 located on the left relative to the direction of flight (x-axis). Lower, central and upper track portions 16 to 18 are arranged in the lateral frame 8. Preferably used as track portions 16 to 18 are seat track systems which are used as standard in the aviation industry or are slightly modified and comprise a grid of holes extending in the longitudinal direction (x-axis), the recesses each being arranged at a distance of 2.54 cm from one another. The track portions 16 to 18 enable useful loads, such as canvas seats for passengers, couches or useful load containers to be fixed or connected in position in the aircraft in fixed grid spaces by standardised fastening means. Two base frame segments 19, 20 (what are known as "cat walks") are arranged mirror-symmetrically to one another in a lower region of the two lateral frames 7, 8.

Figure 2:
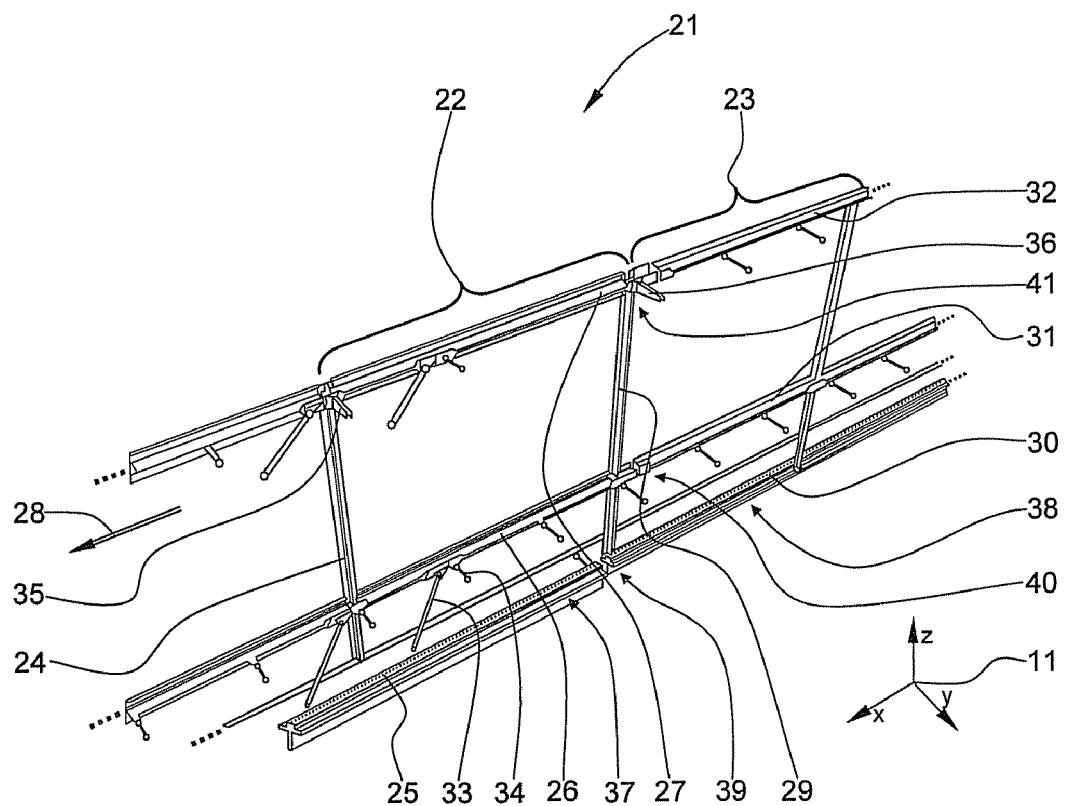
FIG. 2 is a perspective view of a load introduction structure comprising two lateral frame segments.

FIG. 2 is a perspective view of a load introduction structure comprising two adjoining lateral frame segments, one arranged behind the other. A load introduction structure 21 comprises two lateral frame segments 22, 23 which adjoin one another, one arranged behind the other. The coordinate system 11 demonstrates the spatial position of the components. The front lateral frame segment 22 comprises, inter alia, a vertical strut 24 and lower, central and upper track portions 25 to 27, each arranged transversely to the vertical strut 24. The three track portions 25 to 27 extend parallel to a longitudinal axis 28 of the aircraft, the fuselage airframe structure (not shown in the drawing) being arranged symmetrically relative to this axis. The rear lateral frame segment 23 comprises a vertical strut 29 and lower, central and upper track portions 30 to 32 in a corresponding manner.

The load introduction structure 21 is connected to the fuselage airframe structure (not shown in FIG. 2), in particular to the ring frames within the fuselage airframe structure, by a plurality of x-rods and y-rods which are preferably dimensioned to introduce loads into the aforementioned spatial directions of the coordinate system 11. In FIG. 2, one x-rod 33 and one y-rod 34 are provided with reference numerals and are representative of all the other rods. Furthermore, the lateral frame segments 22, 23 are each connected to the primary structure, i.e. the ring frames of the fuselage airframe in particular, by what are known as part-articulated y-cardan rods 35, 36. In addition, the lateral frame segments 22, 23 each have base frame segments 37, 38 in the region of a subsequent floor surface. Provided, according to the invention, in each case between the lower track portions 25, 30, the central track portions 26, 31 and the upper track portions 27, 32 are coupling members 39 to 41 which allow tolerances to be compensated in the direction of the x-axis of the coordinate system 11 by forming a gap (not visible in FIG. 2) in order to achieve stress-free compensation of the thermal and/or manoeuvre-induced change in length of the fuselage airframe which may reach approximately up to 2 mm per meter of fuselage length of the aircraft, and thus to produce the uncoupling intended according to the invention, i.e. a non-load-increasing connection between the load introduction structure 21 and the surrounding fuselage airframe structure.

Arranged between the vertical struts, the base frame segments 37, 38 and the track portions 25 to 27, 30 to 32 of the lateral frame segments 22, 23 are further connection elements (not shown in greater detail) to achieve a sufficient load-bearing capacity.

A plurality of very different useful loads, including, for example, canvas seats or other functional units, may be connected to the two lateral frame segments 22, 23 of the load introduction structure 21. The canvas seats are locked in the track portions by a plurality of belts and standardised fastening elements at distances of 2.54 cm. The passengers to be transported in this case sit transversely to the longitudinal axis 28 of the aircraft, unlike conventional seating arrangements.

Figure 3:
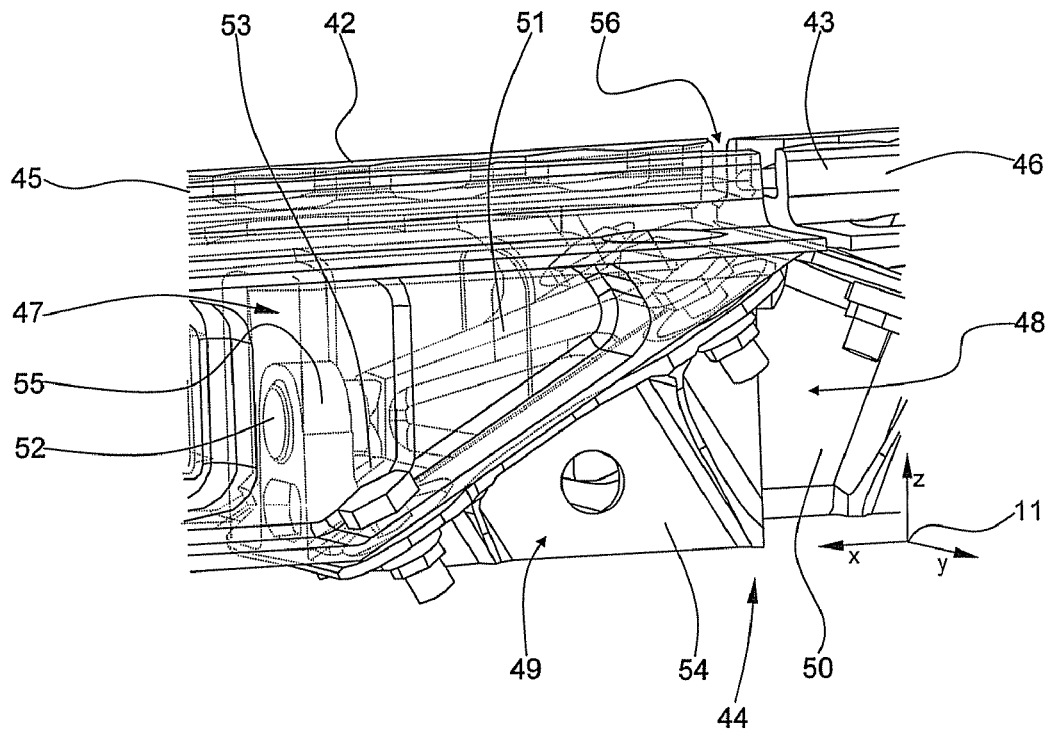
FIG. 3 is a coupling element between two lower track portions.

FIG. 3 shows a coupling element between two lower track portions with a substantially T-shaped cross-section which corresponds approximately to the standard seat track type used in the aviation industry. The coordinate system 11 demonstrates the spatial position of the components. Two lower (seat) track portions 42, 43 formed from an aluminium alloy material or a titanium alloy are connected to one another by a coupling member 44. Head portions 45, 46 of both track portions 42, 43 have a plurality of recesses (not provided with any further reference numerals) which are arranged in a fixed grid pattern along the x-axis of the coordinate system 11 and in which standardised fastening means, in particular "stand-ups" used as standard in the aviation industry for fixing the position of useful loads can be inserted and locked. The head portions 45, 46 have an approximately U-shaped cross-sectional shape which is open upwards, whereas the lower parts (in the z-direction) of the (standard) track portions 42, 43 are substantially T-shaped in cross-section. Each track portion 42, 43 is provided with an end portion 47, 48 which is reinforced by milling and is flange-mounted to the coupling member 44, for example by four fastening screws on each side. The coupling member 44 itself is formed by two fastening blocks 49, 50, the fastening block 50 on the right-hand side comprising a nose-like, wedge-shape projection 51 which extends at its end into a cylindrical pin 52. The fastening block 49 on the left-hand side is provided with two legs 53, 54, the ends (not provided with reference numerals) of which are connected by a lug 55, thus forming, between the legs 53, 54, a recess (not provided with a reference numeral) for receiving in an interlocking manner, at least in regions, the wedge-shaped projection 51. The projection 51 is received between the legs 53, 54 so as to be displaceable parallel to the x-axis of the coordinate system 11 and forms a gap 56, the cylindrical pin 52 additionally being guided in the lug 55. In this way, the coupling member 44 configured according to the invention allows, by means of the fastening blocks 49, 50 which are pushed mutually into one another, the two track portions 42, 43 to move freely only in the direction parallel to the x-axis to ensure that uncoupling can take place, whilst it is still possible to transfer forces in all other spatial directions and degrees of freedom. The gap 56 enables compensation to be achieved between the fuselage airframe structure (primary structure), which is subject to considerable changes in length as a result of temperature changes and manoeuvre-induced loads, and the load introduction structure, thus ultimately achieving the desired uncoupling effect.

Figure 4:
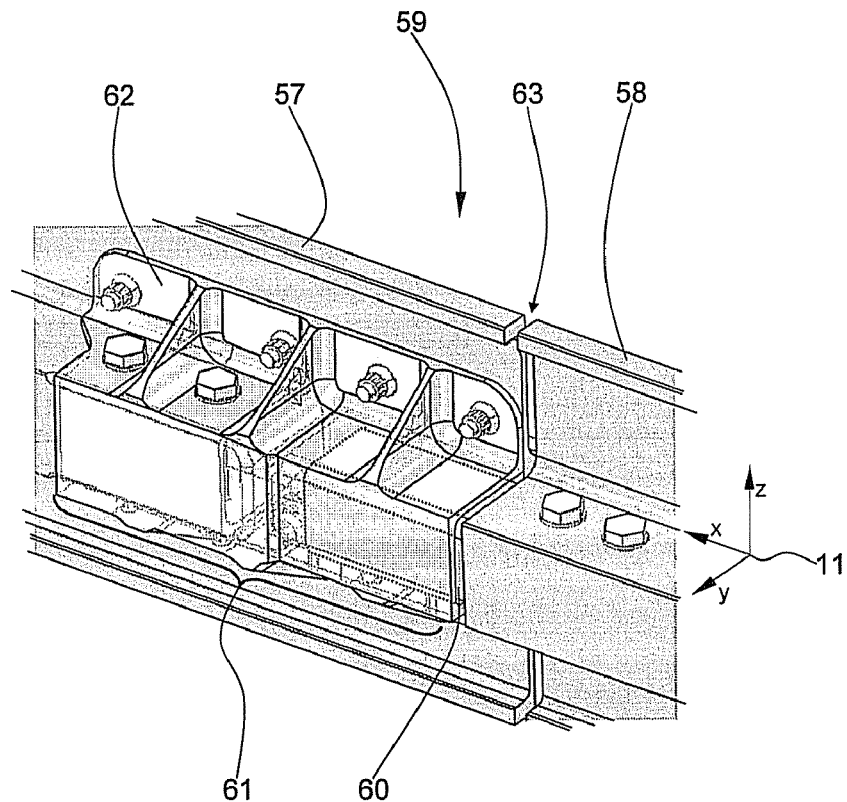
FIG. 4 is a coupling element between two central and two upper track portions.

FIG. 4 shows an embodiment of a coupling member used to connect the central and upper track portions. Two track portions 57, 58 are connected to one another by a further coupling member 59. Unlike the track portions 42, 43 in FIG. 3, the track portions 57, 58 each have a substantially rectangular cross-section with a hollow interior (hollow rectangular profile or hollow square profile) in a core region (not provided with a reference numeral) to ensure that the subsequent load introduction structure has sufficiently high torsional strength against torques, the effective axis of which extends parallel to the x-axis of the coordinate system 11 or coincides therewith. On account of the configuration, these (torsional) loads on the track portions 57, 58 are greater along the lateral walls of the fuselage airframe structure and cannot be absorbed by conventional seat track profiles, of which the profile head is U-shaped and the rest has a T-shaped cross-section. A pin 60 with a rectangular or square cross-section is fastened in the track portion 58, for example by two screws, rivets or the like. To produce the connection between the track portions 57, 58, the pin 60 which projects from the track portion 58 is inserted into the track portion 57 on the left-hand side bus is not connected thereto in order to compensate for displacement forces acting parallel to the x-axis of the coordinate system 11. The cross-sectional shape of the pin 60 is dimensioned in such a way that an interlocking fit is produced at least in regions between the pin 60 and the core region of the track portion 57 on the left-hand side with the rectangular or square cross-section with a hollow interior. To reinforce the edges of the track portion 57, a sleeve 62 or a collar with a substantially U-shaped cross-section provided in an end portion 61 is placed on the core region of the track portion 57 and is connected thereto. The sleeve 62, which is preferably formed in one piece from an aluminium alloy material or a titanium alloy, may be fastened to the end portion 61 with suitable screws, rivets or the like for example. As a result, the coupling member 59 transfers all torques and forces in all spatial directions, with the exception of forces acting parallel to the x-axis, between the track portions 57, 58 with the formation of a gap 63.

Figure 5:
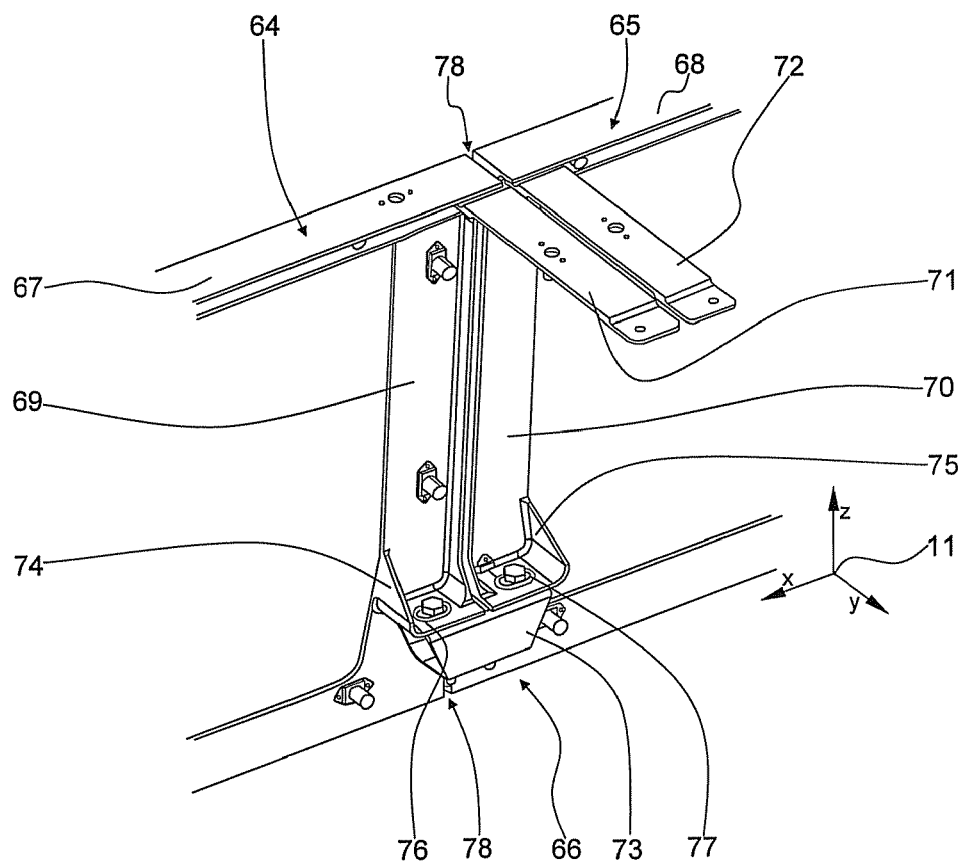
FIG. 5 is a coupling element between two base frame segments.

FIG. 5 shows a coupling element between two base frame segments of the load introduction structure. Two base frame segments 64, 65 are connected to one another by a coupling member 66. Each base frame segment 64, 65 is provided with two longitudinal struts which extend parallel to one another in the direction of the x-axis of the coordinate system 11 and of which the upper longitudinal struts 67, 68 of the base frame segment 64, 65 are provided with a reference numeral and are representative of all the other longitudinal struts. The longitudinal struts of the base frame segments 64, 65 are each connected at the ends thereof to vertical struts 69, 70 which extend parallel to the z-axis. Two cantilevers 71, 72 which extend substantially parallel to the y-axis are also fastened to the ends of the two base frame segments 64, 65 or the longitudinal struts 67, 68. In the embodiment shown, the coupling member 66 for connecting the two base frame segments 64, 65 is formed so as to have a square or rectangular hollow profile 73. Two flanges 74, 75, in each of which a slot 76, 77 is formed, are arranged on the two vertical struts 69, 70. The two base frame segments 64, 65 are connected by the coupling member 66 which is connected for this purpose to the flanges 74, 75 by suitable fastening means, such as screws or the like. The two slots 76, 77 enable the base frame segments 64, 65 to move relative to one another parallel to the x-axis of the coordinate system with the formation of a narrow gap 78.

Figure 6:
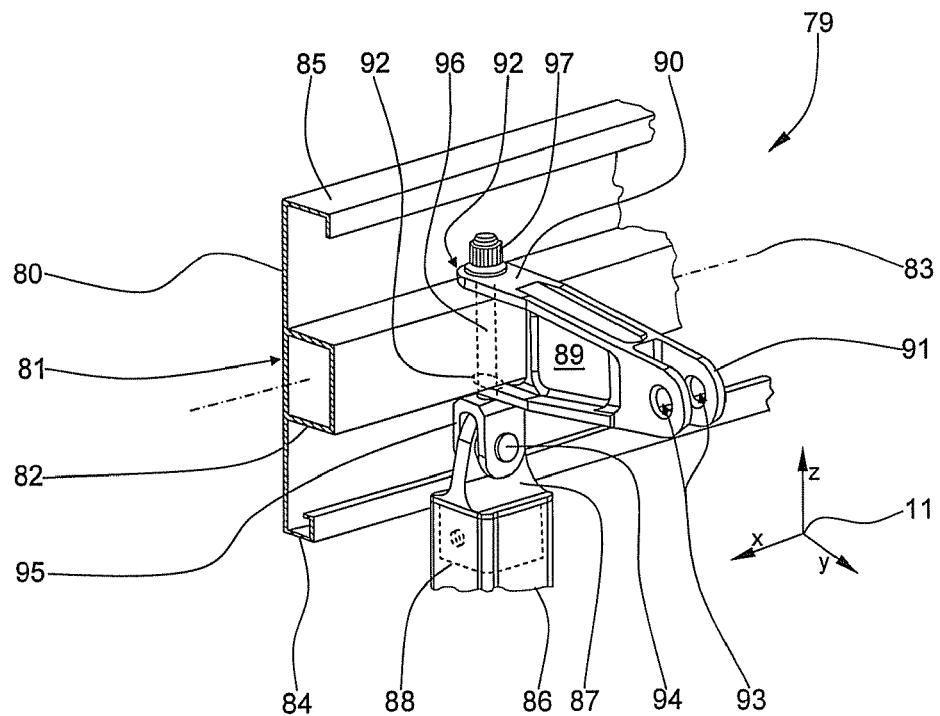
FIG. 6 is a perspective view of a y-cardan rod, as it is known, for laterally connecting the load introduction structure to a fuselage airframe structure of an aircraft.

FIG. 6 is an enlarged perspective view of a y-cardan rod (see FIG. 2, reference numerals 35, 36) for laterally connecting the load introduction structure to a fuselage airframe structure of an aircraft. A (profile) track portion 79 formed in one piece, preferably in an extrusion process, is provided with a planar, plate-shaped rear wall 80 adjoined by a core portion 81. The core portion 81 is formed as a rectangular or square hollow profile 82 with a hollow interior which laterally adjoins the track portion 79 approximately symmetrically to a longitudinal axis 83 of said track portion 79. The hollow profile 82 enables strong torsional forces about the x-axis which are generated in particular on account of the lever action of the lateral seating arrangement, to be absorbed and transferred into the lining frame. In both a lower and upper region (not provided with reference numerals), the rear wall 80 is provided with a bent portion 84, 85 which points in the direction of the y-axis and provides the track portion 79 with C-shaped cross-section in each of these regions. The material thickness of the rear wall 80 is preferably the same as that of the hollow profile 82. In the load introduction structure according to the invention, the track portion 79 is preferably used as a central and upper track portion for connecting useful loads. The track portion 79 is connected to a vertical strut 86 of the lining frame (not shown in FIG. 6) by a lug 87 which is connected in an interlocking and frictional manner to the vertical strut 86 by an insertion member 88. Two holes (not provided with reference numerals) are formed in the hollow profile 82. A y-cardan rod 89 is provided, at fork heads 90, 91 at both ends, with through-holes 92, 93, the longitudinal axes of which are offset by 90° from one another to allow cardan movement. The longitudinal axis of the holes 92 extends parallel to the z-axis, whereas the longitudinal axis of the holes 93 extends parallel to the x-axis. A further fork head 95 is articulated at the lug 87 by a (transverse) bolt 94 so as to pivot about the x-axis. The fork head 95 continues upwards into a further bolt 96 which extends parallel to the z-axis. The perpendicular bolt 96 is guided through two holes (not provided with reference numerals) in the hollow profile 82 and the through-holes 92 in the rear fork head 90 of the y-cardan rod 89 and secured by a nut 97. The bolt 96 enables the y-cardan rod 89 to pivot about the z-axis relative to the track portion 79.

The y-cardan rod 89 is connected to a ring frame within the fuselage airframe structure by a further bolt (not shown) guided through the hole 93. For this purpose, this bolt is received by a barrel hinge (not shown) inside the through-hole 93 of the y-cardan rod 89 which enables movement beyond mere rotation about the x-axis to be achieved in the form of a tumbling motion about the x-axis. The y-cardan rod 89 thus enables compensating movements of the track portion 79 in relation to the ring frame along the y-axis to take place, thus causing a slight parallel displacement of the track portion 79 parallel to the x-axis.

The invention claimed is:

1. A load introduction structure for an aircraft, comprising two lateral frames which are arranged opposite one another in the two lateral regions of a fuselage airframe structure of the aircraft and adjoin a continuous floor surface, wherein the load introduction structure is connected by a non-load-increasing connection to the fuselage airframe structure of the aircraft that creates an uncoupling effect in order to compensate for at least one of load-induced deformations or thermally-induced deformations of the fuselage airframe structure;

wherein the fuselage airframe structure is formed by a plurality of ring frames which are covered externally by a fuselage airframe skin, the lateral frames each being connected to the ring frames, and wherein the lateral frames are connected to the ring frames by a plurality of rods comprising an articulated rod connection, wherein each lateral frame comprises at least two lateral frame segments, wherein each lateral frame segment comprises at least one base frame segment, wherein each base frame segment comprises upper longitudinal struts which are connected at the ends thereof to vertical struts, and wherein flanges are arranged on the vertical struts in each of which a slot is formed, wherein the slots enable the base frame segments to move relative to one another in a longitudinal direction with the formation of a gap to compensate a change in length of the fuselage airframe structure.

2. The load introduction structure according to claim 1, wherein each lateral frame segment has at least three track portions which extend parallel to a longitudinal axis of the aircraft and are each connected to at least one vertical strut.

3. The load introduction structure according to claim 1, wherein the two lateral frames are connected by a ceiling frame which is connected in a ceiling region of the fuselage airframe structure.

4. The load introduction structure according to claim 2, wherein the non-load-increasing connection comprises a coupling member that connects each track portion of a lateral frame segment to at least one of the adjoining track portion or at least one vertical strut with the formation of a gap.

5. The load introduction structure according to claim 4, wherein each coupling member allows the track portions to move slightly, parallel to the longitudinal axis of the aircraft.

6. The load introduction structure according to claim 2, wherein the track portions are formed as lower, central or upper track portions.

7. The load introduction structure according to claim 6, wherein the lower track portions have a substantially T-shaped cross-section.

8. The load introduction structure according to claim 6, wherein the central and upper track portions have a substantially rectangular cross-section.

9. The load introduction structure according to claim 2, wherein at least one track portion is articulated to at least one ring frame by at least one y-cardan rod.

10. The load introduction structure according to claim 2, wherein a plurality of useful loads comprising at least one of seats containing passengers or other functional units are fastenable to the track portions transversely to the longitudinal axis of the aircraft.

11. The load introduction structure according to claim 1, wherein a plurality of lining panels are fastened to the interior of the load introduction structure.

12. The load introduction structure according to claim 1, wherein the floor surface rests on a floor frame.

13. The load introduction structure according to claim 1, wherein the load-induced deformations or thermally-induced deformations for which the non-load-increasing connection compensates comprises a change in length of the fuselage airframe structure.

* * * * *